(12) United States Patent
Yi et al.

(10) Patent No.: US 8,631,502 B2
(45) Date of Patent: Jan. 14, 2014

(54) METHOD AND APPARATUS FOR UPDATING REVOCATION LIST AND REPRODUCING ENCRYPTED CONTENT

(75) Inventors: Sung-jun Yi, Seongnam-si (KR); Nam-geol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 750 days.

(21) Appl. No.: 12/348,033

(22) Filed: Jan. 2, 2009

(65) Prior Publication Data

US 2009/0172825 A1 Jul. 2, 2009

(30) Foreign Application Priority Data

Jan. 2, 2008 (KR) .................. 10-2008-0000160

(51) Int. Cl.
*G06F 17/30* (2006.01)

(52) U.S. Cl.
USPC ............................................................ 726/27

(58) Field of Classification Search
USPC ............................................................ 726/27
See application file for complete search history.

(56) References Cited

U.S. PATENT DOCUMENTS

| | | | |
|---|---|---|---|
| 5,949,877 A | | 9/1999 | Traw et al. |
| 6,850,914 B1 | | 2/2005 | Harada et al. |
| 7,010,809 B2 * | | 3/2006 | Hori et al. ................. 726/26 |
| 7,080,043 B2 | | 7/2006 | Chase, Jr. et al. |
| 7,206,748 B1 | | 4/2007 | Gruse et al. |
| 7,277,870 B2 | | 10/2007 | Mourad et al. |
| 2004/0205345 A1 * | | 10/2004 | Ripley et al. ............... 713/176 |
| 2005/0076208 A1 * | | 4/2005 | Hori et al. ................. 713/165 |
| 2005/0278534 A1 * | | 12/2005 | Nadalin et al. ............. 713/175 |
| 2007/0039058 A1 | | 2/2007 | Alkove et al. |
| 2008/0091941 A1 * | | 4/2008 | Yonezawa et al. .......... 713/158 |
| 2008/0134340 A1 * | | 6/2008 | Ueda et al. ................. 726/26 |
| 2009/0172825 A1 * | | 7/2009 | Yi et al. ..................... 726/33 |

FOREIGN PATENT DOCUMENTS

| | | |
|---|---|---|
| KR | 10-2004-0076834 A | 9/2004 |
| KR | 10-2005-0094316 A | 9/2005 |
| KR | 1020050096036 A | 10/2005 |
| KR | 1020060015547 A | 2/2006 |
| WO | 2005119398 A1 | 12/2005 |

OTHER PUBLICATIONS

R. Housley, et al, "Internet X.509 Public Key Infrastructure Certificate and Certificate Revocation List (CRL) Profile"; IETF; Apr. 2002; pp. 1-115.

* cited by examiner

*Primary Examiner* — Cordelia Zecher
(74) *Attorney, Agent, or Firm* — Sughrue Mion, PLLC (57) ABSTRACT

Method of updating revocation list is disclosed. Time information of revocation list indicating registration time of most recently registered revocation entity included in revocation list of first device is extracted, and time information of revocation list indicating registration time of the most recently registered revocation entity included in the revocation list of a second device connected to the first device is also extracted. A revocation entity registered in the first device after the registration time of time information of the revocation list of the second device is copied in the revocation list of the second device, if the registration time of extracted time information of the revocation list of the first device is later than the registration time of the extracted time information of the revocation list of the second device. Thus, the revocation list can be updated by connecting the first and second devices even in an offline state.

21 Claims, 8 Drawing Sheets

METHOD AND APPARATUS FOR UPDATING REVOCATION LIST AND REPRODUCING ENCRYPTED CONTENT

CROSS-REFERENCE TO RELATED PATENT APPLICATION

This application claims the benefit of Korean Patent Application No. 10-2008-0000160, filed on Jan. 2, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to updating a revocation list and reproducing encrypted content, and more particularly to a method of updating a revocation list including at least one revocation entity, a method of updating a revocation list between devices in an off-line state, a method of enabling or disabling reproduction of encrypted content on the basis of a revocation list, and apparatuses therefore.

2. Description of the Related Art

In recent years, the amount of digital content has drastically increased, and thus demands for digital rights management (DRM) technologies are rapidly increasing. DRM may be defined as a technology for preventing illegal copying of content in the narrow sense, but, in the broad sense, DRM may be an umbrella term that encompasses technologies and service systems for ensuring transparency and reliability over the entire life cycle of the digital content. That is, DRM may be a technology and a service system that manage intellectual property rights and ensure a transparent and reliable distribution environment over the entire life cycle of the digital content. DRM services have different definitions and ranges according to venders. International Data Corporation (IDC) provides a definitive explanation of DRM services as "software and services used over the entire life cycle of the digital content from creation and distribution of the digital content to consumption thereof". IDC classifies various uses of DRM into four representative uses.

First, DRM is used to protect the commercial value of digital content by preventing illegal copying.

Secondly, DRM is used to protect content secrecy in terms of document security between enterprises or within an enterprise.

Thirdly, DRM is used to protect intellectual property rights for content such as treatises, photographs and novels that are not for sale.

Fourthly DRM may be used to ensure integrity of digital content without modification, damage and correction during a distribution process.

In selling or distributing the content, a situation where reproduction or redistribution of sold content must be blocked occurs even after the selling of the content is completed. For example, the use of distributed content must be prohibited if the distributed content is associated with social problems or arbitrary publicity of a specific product. Also, if the content distributed using DRM in a free trial period is used without authorization through DRM hacking, the permission or authorization to use the corresponding content must be collectively revoked. However, in the case of general DRM being currently used, once purchase of content is completed, it is difficult to restrict the use of the corresponding content. Thus, there are DRM solutions for providing revocation functions. However, these DRM solutions have limitations in that whenever the content is reproduced, it must be checked whether reproduction of corresponding content is enabled only through network communication. For this reason, conventional DRM solutions are limited by a device, and are useless in an offline state.

SUMMARY OF THE INVENTION

The present invention provides a method and apparatus for updating a revocation list in an offline state, and a method and apparatus for providing a revocation function applicable to various kinds of DRM. The present invention also provides a method and apparatus for using the revocation list to reproduce encrypted content.

According to one aspect of the present invention, there is provided a method of updating a revocation list. The method comprises transmitting time information of a revocation list comprising at least one revocation entity to a server, the time information indicating a registration time of the most recently registered revocation entity; and copying the revocation entity which is registered to the server after the registration time from the server into the revocation list.

According to another aspect of the present invention, there is provided a method of updating a revocation list. The method comprises extracting respectively time information of a revocation list from at least one revocation entity included in the revocation list of a first device and a second device connected the first device, the time information indicating a registration time of the most recently registered revocation entity; and copying, into the revocation list of the second apparatus, a revocation entity that is registered in the first device after the registration time of time information of the revocation list of the second device, if the registration time of the extracted time information of the revocation list of the first device is later than the registration time of the extracted time information of the revocation list of the second device.

According to another aspect of the present invention, there is provided a method of reproducing encrypted content. The method comprises extracting a content unique identifier from encrypted content; determining whether the extracted content unique identifier is present in a revocation entity comprising a content unique identifier; and prohibiting reproduction of the content if the extracted content unique identifier is present in the revocation entity.

According to another aspect of the present invention, there is provided a apparatus for updating a revocation list. The apparatus comprises a revocation list storage unit storing a revocation list comprising time information and at least one revocation entity comprising a content unique identifier, and time information indicating a registration time of the most recently registered revocation entity; and a control unit copying the revocation entity which is registered to a server after the registration time from a server into the revocation list.

According to another aspect of the present invention, there is provided a apparatus for updating a revocation list. The apparatus comprises a revocation list storage unit storing a revocation list comprising time information at least one revocation entity comprising a content unique identifier, and time information indicating a registration time of the most recently registered revocation entity; a revocation list extraction unit extracting the time information of the revocation list stored in the revocation list storage unit, and time information of a revocation list of another apparatus; and a control unit copying, into the revocation list of the other apparatus, a revocation entity that is registered after the registration time of time information of the revocation list of the other apparatus, if the registration time of the extracted time information is later than registration time of the extracted time information of the revocation list of the other apparatus.

According to another aspect of the present invention, there is provided a apparatus for reproducing encrypted content. The apparatus comprises a revocation list storage unit storing a revocation list comprising at least one revocation entity comprising a content unique identifier; a content unique identifier extraction unit extracting a content unique identifier from encrypted content to be reproduced; and a control unit prohibiting reproduction of the content if the content unique identifier extracted by the content unique identifier extraction unit is present in the revocation entity.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
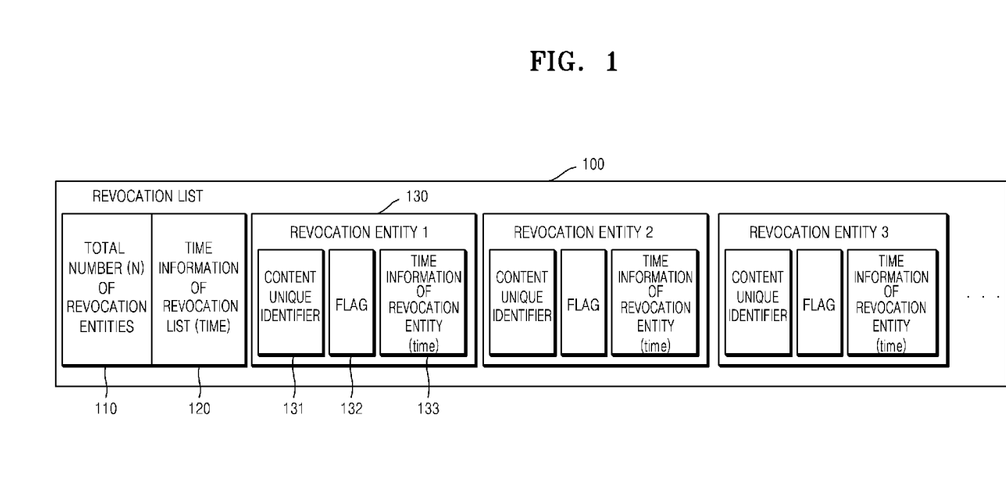
FIG. 1 is a block diagram illustrating a structure of a revocation list according to an embodiment of the present invention.

FIG. 1 is a block diagram illustrating a structure of a revocation list 100 according to an embodiment of the present invention. Referring to FIG. 1, the revocation list 100 according to the current embodiment includes a total number (N) 110 of revocation entities, time information of revocation list (TIME) 120, and at least one revocation entity 130. The revocation entity 130 includes a content unique identifier 131, a flag 132, and time information of revocation entity (time) 133.

The revocation list 100 is a data structure that stores information of content or a device in which reproduction of content is to be restricted. The revocation list 100 may be configured using extensible markup language (XML), and may be implemented using any other structure. Also, the revocation list 100 can be updated by adding a revocation entity 130. According to an embodiment of the present invention, the revocation list 100 is used to disable reproduction of the content or to enable reproduction of DRM-restricted content. The revocation list 100 may be stored in a content reproducing device or a portable storage device.

The total number (N) 110 of revocation entities refers to the total number of revocation entities 130 stored in the revocation list 100. Time information of revocation list (TIME) 120 indicates a registration time of a revocation entity that is most recently registered to a revocation list management server (see FIG. 2) among the at least one revocation entity 130 stored in the current revocation list 100. The revocation entity 130 is an entity that has information of content to be revoked or restored and reproduced within the revocation list 100. According to an embodiment of the present invention, the revocation list 100 includes at the least one revocation entity 130. The content unique identifier 131 contained in each revocation entity 130 refers to an identifier that uniquely identifies content. Each of contents has a different identifier. The content unique identifier 131 may be contained in a header of the content, and it is impossible for an unauthorized user to modify the content unique identifier 131. Each of contents can have a different identifier by using time information of the time when the content is registered. The flag 132 is binary information that indicates prohibition of content reproduction or restoration and reproduction of the prohibited content, i.e., restricted content. Time information of the revocation entity (time) 133 indicates the time when the corresponding revocation entity 130 is registered to the revocation list server.

Figure 2:
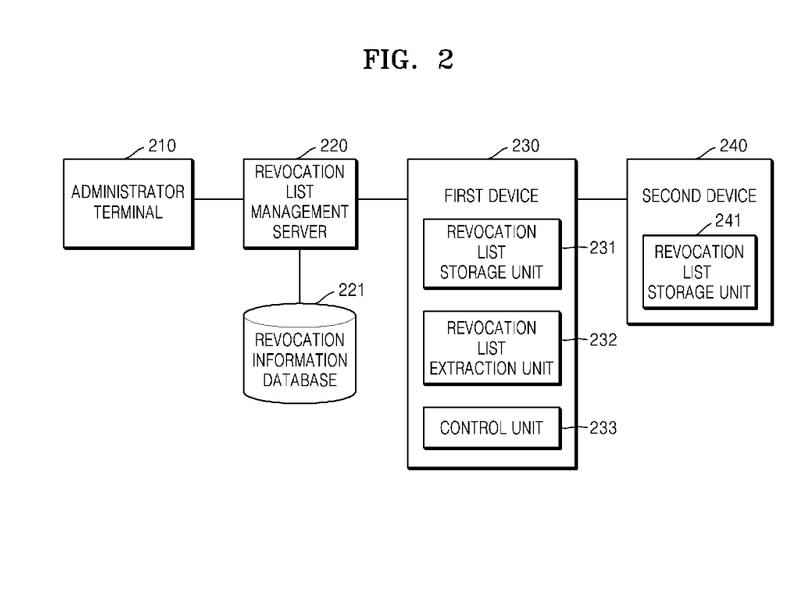
FIG. 2 is a block diagram illustrating a system for updating a revocation list, according to an embodiment of the present invention.

FIG. 2 is a block diagram illustrating a system for updating a revocation list such as the revocation list 100 of FIG. 1, according to an embodiment of the present invention.

Referring to FIG. 2, the revocation list update system according to the current embodiment includes an administrator terminal 210, a revocation list management server 220, and a first device 230 and a second device 240 which are revocation list update apparatuses. The revocation list management server 220 includes a revocation information database 221. The first apparatus 230 includes a revocation list storage unit 231, a revocation list extraction unit 232, and a control unit 233. The second apparatus 240 includes a revocation list storage unit 241.

The revocation list management server 220 receives content information of content to be revoked or restored via the administrator terminal 210. The content information may include a content unique identifier. On the basis of the received content information, the revocation list management server 220 registers the revocation entity to the server 220 and writes and stores the revocation entity in the revocation information database 221. A registration time indicating when the written revocation entity is registered in the revocation list management server 220 may be contained in the revocation entity. The stored revocation identity cannot be deleted or modified. To restore the content, revocation of which has been requested, another revocation entity having a flag value indicating restoration may be written and registered. If there is a request for a revocation entity from the first device 230, the revocation list management server 220 transmits the corresponding revocation entity to the first device 230.

The first device 230 updates the revocation list 100. The first device 230 updates the revocation list 100 by adding a revocation entity 130 received from the revocation list management server 220 to the revocation list 100. Examples of the first device 230 may include a personal computer (PC), an MP3 player, a portable media player (PMP), a set-top box, a mobile phone, and a kiosk. A structure of the revocation list 100 is created by the first device 230. Since no revocation entity 130 is present in the revocation list 100 when the revocation list 100 is initially created, the total number (N) 110 of revocation entities is '0', and time information of the revocation list (TIME) 120 is '0'. The revocation list storage unit 231 of the first device 230 stores the revocation list 100 written in the first device 230.

The control unit 233 of the first device 230 transmits time information of the revocation list (TIME) 120 extracted by the revocation list extraction unit 232 to the revocation list management server 220. The control unit 233 copies one or more revocation entities 130 registered after the registration time of the transmitted time information of the revocation list 120 among revocation entities registered in the revocation list management server 220, and stores the copied revocation entities 130 in the revocation list 100 stored in the revocation list storage unit 231. When the first device 230 is connected online with the revocation list management server 220, the control unit 233 may immediately access the revocation list management server 220 and copy the revocation entity 130, but a service provider may manage the time point of copying the revocation entity 130. If the copied revocation entity 130 is associated with restoration of content whose usage permission was previously revoked, an existing revocation entity 130 associated with the previous revocation of the content may be deleted from the revocation list 100. This is because only the latest revocation entity 130 is needed to reproduce content. However, deletion is not necessary because an excessive load may be applied to the device when the revocation list 100 is updated. The control unit 233 changes time information of the revocation list (TIME) 120 on the basis of time information (TIME) 133 of the revocation entity 130 that has been most recently registered to the revocation list management server 220 among the copied revocation entities 130. In the case of an initially written revocation list, all the revocation entities 130 registered to the server 200 are copied and stored in the revocation list 100, and time information of the revocation list (TIME) 120 is changed according to time information 133 of the most recently registered revocation entity 130.

If the first device 230 includes a revocation list 100 and a portable storage device (not shown) included in the first device 230 does not include a revocation list, the first device 230 copies and stores the revocation list 100 in the portable storage device. The portable storage device includes a non-volatile memory such as a flash memory that can read, write and erase data. The portable storage device may be a storage device that is capable of performing predetermined operations on data and is easily connected to and separated from a revocation list update apparatus and a reproducing apparatus. Examples of the portable storage device may include smart media, a memory stick, a Compact Flash (CF) card, an XD card, a Secure Digital (SD) card, a secure digital high capacity (SDHC) card, and a multimedia card (MMC). The revocation list 100 may not be created, modified or deleted arbitrarily by a user and may be securely stored within the first device 230 and the portable storage device. Examples of the method of storing the revocation list 100 may include storing the revocation list 100 in a secure area of a flash memory such as a Secure MMC and storing the revocation list 100 as a hidden structure in a general MMC/SD. Alternatively, the revocation list 100 may be stored in the form of database of a hidden system of the first device 230. Those storing methods are merely examples however, and the present invention is not limited thereto.

According to another embodiment, the control unit 232 downloads all of the revocation entities from the revocation list management server 220 as one revocation list, and overwrites the downloaded revocation list of the first device 230 and the portable storage device. This method may cause a large amount of traffic over the network, but may be used when an incident such as an arbitrary change of the stored revocation list occurs.

According to another embodiment of the present invention, an apparatus for updating a revocation list in the first device 230 and the second device 240 is provided. The first device 230 and the second device 240 are connected together, and the first device 230 may be in an offline state with the revocation list management server 220.

The revocation list storage unit 231 of the first device 230 stores a revocation list 100 therein. The revocation list extraction unit 232 extracts time information of the revocation list 120 from the revocation list stored in the revocation list storage unit 231. The revocation list extraction unit 232 of the first device 230 may extract a revocation list 100 from the revocation list storage unit 241 of the second device 240.

The control unit 230 compares time information of the revocation list 120 of the first device 230 with time information of the revocation list 120 of the second device 240. If the comparison indicates that a registration time indicated by time information of the revocation list 120 of the first device 230 is later than a registration time indicated by time information of the revocation list of the second apparatus 240, that is, the registration time of the revocation list of the first device 230 is the latest, revocation entities 130 registered after the registration time of the revocation list of the second device 240 from the revocation list 100 of the first device 230 are copied into the revocation list 100 of the second device 240. In contrast, if the registration time indicated by time information of the revocation list of the second device 240 is later than the registration time indicated by time information of the revocation list of the first device 230, that is, the registration time of the revocation list of the second device 240 is the latest, revocation entities 130 registered after the registration time indicated by time information of the revocation list of the first device 230 from the revocation list of the revocation list 100 of the second device 240 are copied into the registration list 100 of the first device 230. The control unit 232 changes the registration time of the revocation list 100 to the registration time of the most recently registered revocation entity 130 among revocation entities of each of the revocation lists 100. If the second device 240 is connected to the first device 230, which is an update apparatus, in an offline state, downloading or copying of a revocation entity 130 fails because no connection is made with the revocation information management server 220. Therefore, the revocation lists 100 of the first and second device 230 and 240 can be updated to the latest version by synchronizing the revocation lists 100 of the first and second device 230 and 240 connected in an offline state. The second device 240 may be a portable storage device that includes the revocation list storage unit 241. However, the present invention is not limited thereto, and the second device 240 may be another update apparatus, which is applied to the case where update apparatuses are connected in an offline state for updating.

Figure 3:
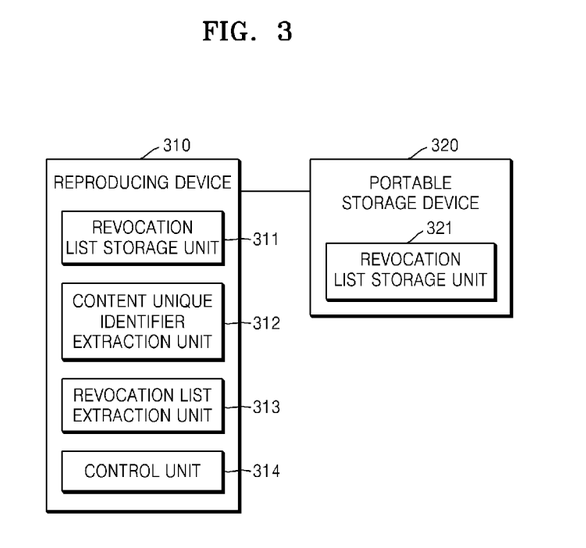
FIG. 3 is a block diagram illustrating a portable storage device and a reproducing device for reproducing encrypted content by using an updated revocation list, according to an embodiment of the present invention.

FIG. 3 is a block diagram illustrating a portable storage device and a reproducing device 310 for reproducing encrypted content by using an updated revocation list, according to an embodiment of the present invention. Referring to FIG. 3, the reproducing device 310 according to the current embodiment includes a revocation list storage unit 311, a content unique identifier extraction unit 312, a revocation list extraction unit 313 and a control unit 314. The portable storage device 320 according to the current embodiment includes a revocation list storage unit 321. The reproducing device 310 is connected with the portable storage device 320.

The first device 230 of FIG. 2 may be the reproducing device 310 that can reproduce encrypted content. The second device 240 may be the portable storage device 320 including a storage unit containing encrypted content or a revocation list.

The revocation list storage unit 311 of the reproducing apparatus 310 stores therein a revocation list including a revocation entity including content unique identifier. The revocation list includes time information indicating a registration time of the most recently registered revocation entity to a server. The content unique identifier extraction unit 312 extracts a content unique identifier of encrypted content to be reproduced. The content may be stored in the reproducing device 310 or may be stored in the portable storage apparatus 320. The revocation list extraction unit 313 extracts a content unique identifier stored in the revocation entity of the revocation list. The control unit 314 compares the content unique identifier extracted by the revocation list extraction unit 313 with the content unique identifier extracted by the content unique identifier extraction unit 312. If the two compared content unique identifiers are identical, reproduction of the content is disabled, i.e., prohibited. The revocation list extraction unit 313 may also extract a flag. If the flag indicates restoration of the prohibited content, the corresponding content is restored and reproduced.

Figure 4:
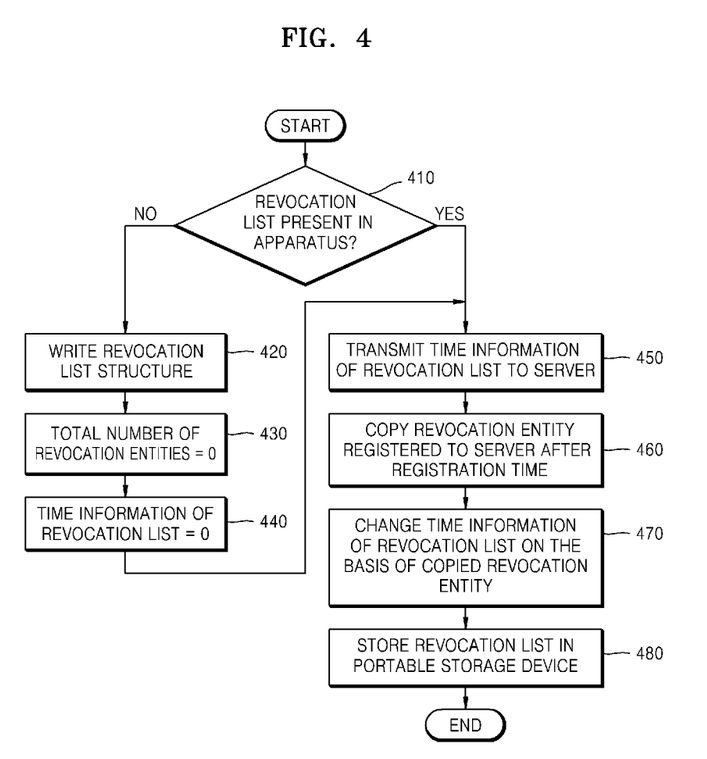
FIG. 4 is a flowchart illustrating a method of updating a revocation list, according to an embodiment of the present invention.

FIG. 4 is a flowchart illustrating a method of updating a revocation list, according to an embodiment of the present invention.

To revoke content, an administrator accesses a revocation list management server and inputs content information of corresponding content including a content unique identifier. The revocation list management server generates a revocation entity by using input content information and the time when the content information is input. Also, the generated revocation entity is stored in a revocation information database. The revocation entity must not be deleted or changed without a specific reason. To restore content, revocation of which has been requested, a revocation entity including a flag indicating restoration of revoked content must be created. In general, the revocation entity is generated according to authorization of the administrator not by a general user.

Referring to FIG. 4, in operation 410, it is determined whether there is a revocation list in an apparatus. If there is a revocation list, the method proceeds to operation 450, and if not, the method proceeds to operation 420.

In operations 420 through 440, since a revocation list does not exist in the apparatus, a revocation list structure is created, and thus the total number of revocation entities is '0' and there is no time information of the revocation list. When a revocation list is created, the method proceeds to operation 450.

In operation 450, the apparatus accesses a revocation list management server, i.e., in an online state, and transfers time information of the revocation list to the revocation list management server. Time information indicates a registration time of the most recently registered revocation entity stored in the revocation list.

In operation 460, a revocation entity registered after the registration time indicated by the transferred time information of the revocation list is copied. The copied revocation entity is stored in the revocation list. If a flag contained in the revocation entity is a flag that indicates restoration of previously revoked content, an existing revocation entity associated with the previous revocation of the content may be deleted. When the apparatus is in an online state, the apparatus may immediately access the revocation list management server and copy revocation entities, but the time of copying may be determined arbitrarily by a service provider.

In operation 470, time information of the revocation list is changed based on time information of the most recently registered revocation entity among the copied revocation entities. If the revocation list is an initially written list, all of the revocation entities stored in the revocation list management server are copied and stored, and time information of the revocation list is changed according to time information of the most recently registered revocation entity.

In operation 480, the revocation list in which the revocation entity has been copied is stored in a portable storage device. In this case, a revocation list does not exist in the portable storage device. The case where the revocation list exists in the portable storage device will be described later in more detail with reference to FIG. 6.

Figure 5:
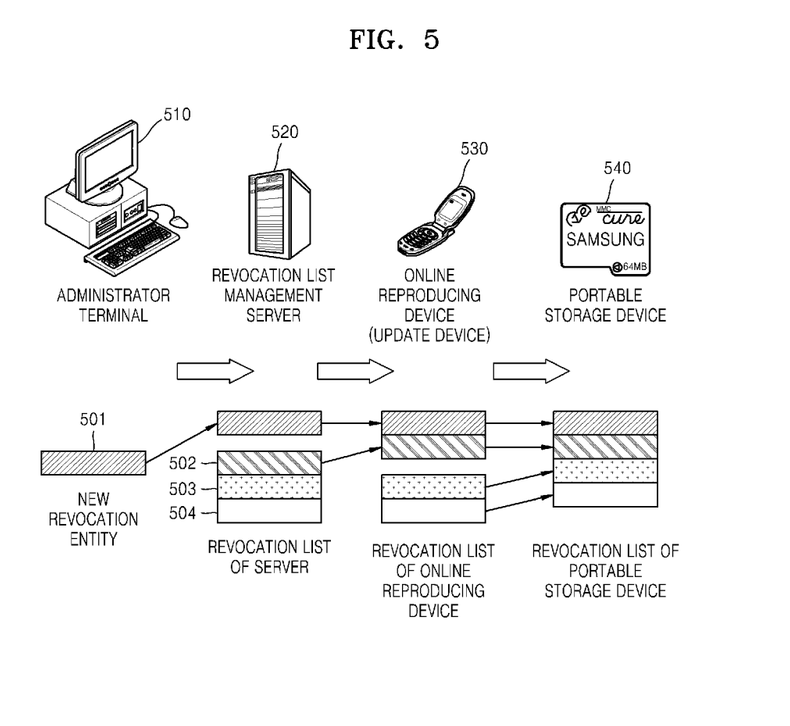
FIG. 5 is a diagram for describing an example of a method of updating a revocation list, according to an embodiment of the present invention.

FIG. 5 is a diagram for describing an example of a method of updating a revocation list, according to an embodiment of the present invention.

Referring to FIG. 5, to revoke or restore content, an administrator transmits a new revocation entity 501 including a content unique identifier of the content to a revocation list management server 520 through an administrator terminal 510. A revocation list in the revocation list management server 520 includes four revocation entities 501 through 504. The revocation entities 501 through 504 may be registered in the time order of 504, 503, 502 and 501. The revocation entity 502 is the next most recently registered revocation entity, besides the revocation entity 501. An online reproducing device 530, which is an update device, includes the revocation entities 503 and 504 in a revocation list. If the online reproducing device 530 is connected online with the revocation list management server 520, the online reproducing device 530 transmits time information of the revocation list. Time information of the revocation list indicates a registration time of the revocation entity 503 to the revocation list management server 520. In this case, since the revocation entities 501 and 502 are registered later than the revocation entity 503 in the revocation list management server 520, the revocation entities 501 and 502 are copied and stored in the revocation list of the online reproducing device 530. Time information of the revocation list indicates the registration time when the revocation entity 501 is registered. If a portable storage device 540 is inserted in the online reproducing device 530, the revocation list including the revocation entities 501 through 504 is copied and stored in the portable storage device 540. The above operations are performed on the assumption that a revocation list does not exist in the portable storage device 540.

Figure 6:
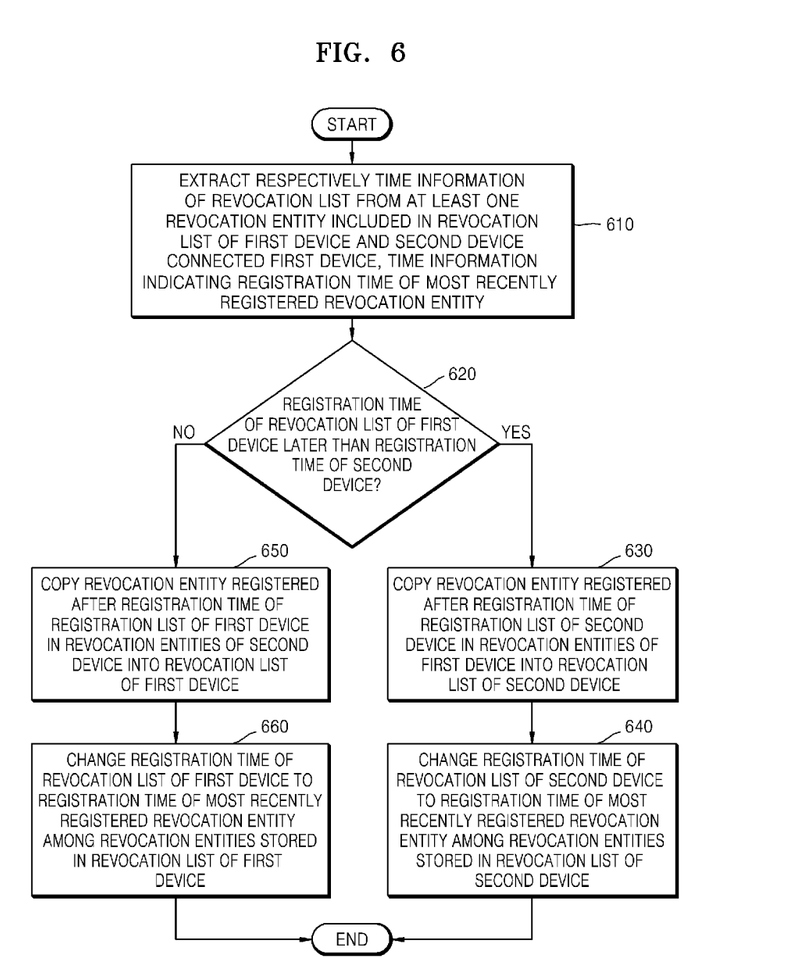
FIG. 6 is a flowchart illustrating a method of updating a revocation list between devices, according to an embodiment of the present invention.

FIG. 6 is a flowchart illustrating a method of updating a revocation list between apparatuses, according to an embodiment of the present invention.

Referring to FIG. 6, in operation 610, time information of a revocation list is extracted respectively from at least one revocation entity included in the revocation list of a first device and a second device connected the first device, the time information indicating a registration time of the most recently registered revocation entity.

In operation 620, it is determined whether the registration time of the extracted time information of the revocation list of the first device is later than the registration time of the extracted time information of the revocation list of the second device. If the registration time indicated by time information of the revocation list of the first device is later than the registration time indicated by time information of the revocation list of the second device, for example, if time information of the revocation list of the first device is Nov. 1, 2007, 19:20, and time information of the revocation list of the second device is Oct. 30, 2007, 14:10, the method proceeds to operation 630, and if not, the method proceeds to operation 650.

In operation 630, revocation entities, which are registered after the registration time indicated by time information of the revocation list of the second device, among revocation entities of the first device are copied into the revocation list of the second device. For example, revocation entities registered after Oct. 30, 2007, 14:10 are copied in the revocation list of the second device.

In operation 640, the registration time of the revocation list of the second device is changed to the registration time of the most recently registered revocation entity among the revocation entities stored in the revocation list of the second device. For example, time information of the revocation list of Oct. 30, 2007, 14:10 is changed to time information of the revocation list of Nov. 1, 2007, 19:20. This is because the time information of Nov. 1, 2007, 19:20 hours is the time information of the most recently registered revocation entity in the first device.

Figure 7:
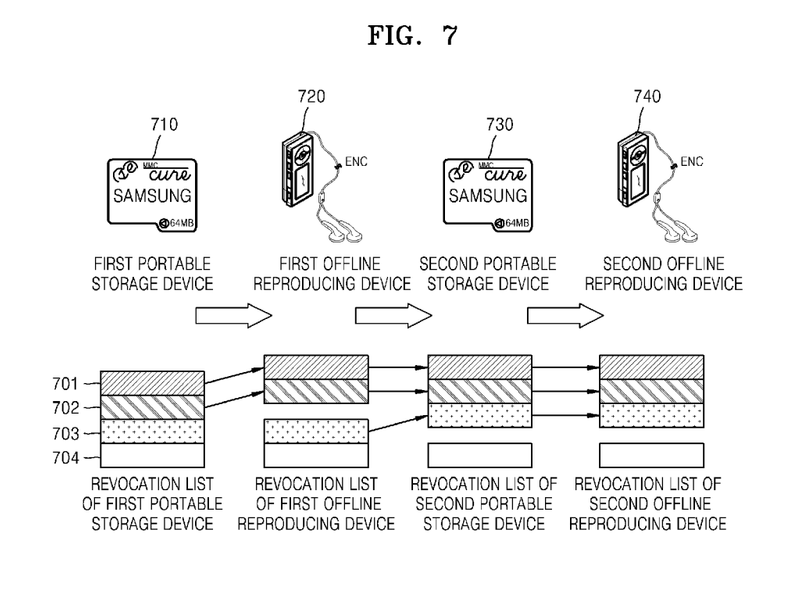
FIG. 7 is a diagram for describing a method of updating a revocation list between devices in an offline state, according to an embodiment of the present invention.

A method of updating a revocation list between apparatus in an offline state will now be described with reference to FIG. 7. FIG. 7 is a diagram for describing an example of a method of updating a revocation list between devices in an offline state, according to an embodiment of the present invention. The description will be made on the assumption that the devices store revocation lists. Referring to FIG. 7, the registration time order in a revocation list of a first portable storage device 710 is a revocation entity 704, a revocation entity 703, a revocation entity 702 and a revocation entity 701. The revocation entity 701 is the most recently registered revocation entity. When the first portable storage device 710 is inserted in a first offline reproducing device 720, time information of the revocation list of the first portable storage device 710 is compared with time information of the revocation list of the first offline reproducing device 720. The revocation entities 701 and 702 of the revocation list of the first portable storage device 710 are copied into the first offline reproducing device 720. After the revocation list of the first offline reproducing device 720 is updated in the above manner, if a second portable storage device 730 is connected to the first offline reproducing device 720, the second portable storage device 730 is updated in the above-described manner. Also, the updating is performed in the same manner when the second portable storage device 730 is connected to a second offline reproducing device 740.

Figure 8:
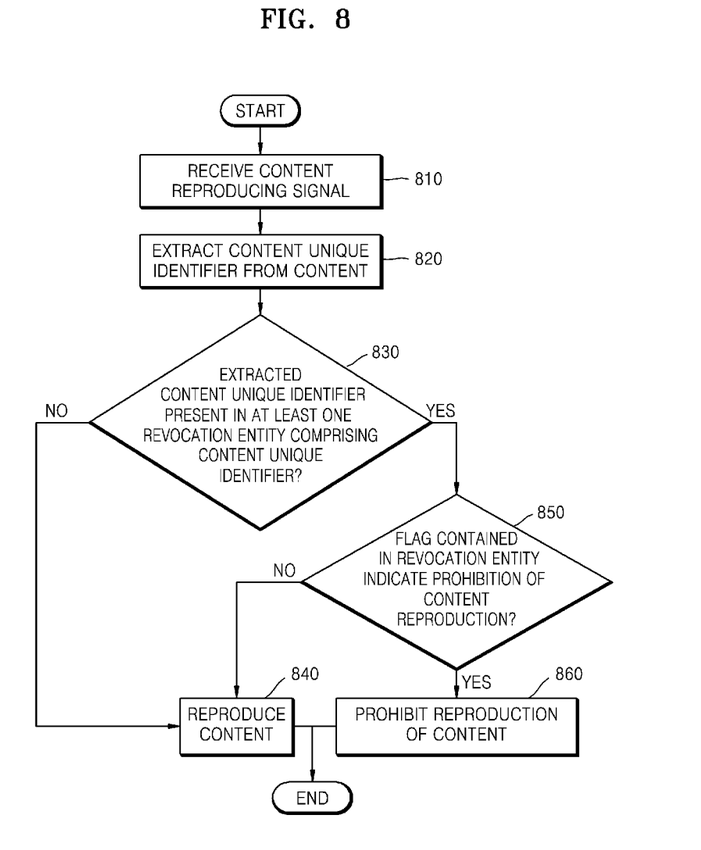
FIG. 8 is a flowchart illustrating a method of reproducing encrypted content, according to an embodiment of the present invention.

FIG. 8 is a flowchart illustrating a method of reproducing encrypted content, according to an embodiment of the present invention.

Referring to FIG. 8, in operation 810, a request signal for reproducing encrypted content is received.

In operation 820, a content unique identifier is extracted from content.

In operation 830, it is determined whether the extracted content unique identifier is present in a revocation list including at least one revocation entity. If the extracted content unique identifier is present in the revocation entity, the method proceeds to operation 850, and if not, the method proceeds to operation 840.

In operation 850, if it is determined that the extracted content unique identifier is present in the revocation entity, it is determined whether a flag contained in a revocation entity is a flag indicating prohibition of content reproduction.

In operation 860, if the flag indicates prohibition of content reproduction, reproduction of the content is disabled. In the case of a flag indicating restoration of prohibited content, the content is reproduced in operation 840.

The method of updating a revocation list and the method of reproducing encrypted content can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In other embodiments, the computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, content associated with various kinds of DRMs can be revoked or restored using one revocation list, and a revocation list can be updated even in an offline state by connecting devices. The revocation list according to the present invention restricts restoration and reproduction of only corresponding content by using a content unique identifier.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of updating a revocation list, the method comprising:
    transmitting time information of a revocation list comprising at least one revocation entity with a unique content identifier linked to a corresponding time indicating registration or update of the revocation entity to a server and a flag which indicates whether the contents identified in the respective entity are prohibited or restored, wherein the time information indicates the corresponding time of a first most recently registered revocation entity; and
    copying each revocation entity registered to the server after the corresponding time of the first most recently registered revocation entity, from the server into the revocation list.

2. The method of claim 1, further comprising changing the time information of the revocation list according to a registration time of a second most recently registered revocation entity among at the least one copied revocation entity, the registration time of the second most recently registered revocation entity being later in time than the registration time of the first most recently registered revocation entity.

3. The method of claim 2, further comprising storing the revocation list comprising the copied revocation entity in a portable storage device.

4. A non-transitory computer readable medium storing a program for executing the method of claim 1.

5. The method of claim 1, further comprising updating a second apparatus comprising a first user interface, which is offline using the updated revocation list stored in a first apparatus comprising a second user interface updated by communicating with the server, wherein the first apparatus is offline.

6. The method of claim 1, wherein a user device is offline and is updated by a first apparatus, which is another user device, that updated the revocation list by communicating with the server, wherein the first apparatus updates the revocation list of a portable memory of the user device.

7. The method of claim 1, wherein the revocation list is configured using extensible markup language.

8. The method of claim 1, wherein the unique content identifier is generated based on time information of when the respective content is registered and wherein the unique content identifier is obtained from a header of the contents.

9. A method of updating a revocation list, the method comprising:
extracting first time information of a first revocation list from at least one revocation entity having a unique content identifier linked to a corresponding time indicating registration or update of the revocation entity included in the first revocation list of a first device and a flag which indicates whether the contents identified in the respective entity are prohibited or restored and second time information of a second revocation list from at least one revocation entity having a unique content identifier linked to a corresponding time indicating registration or update of the revocation entity included in the second revocation list of a second device connected the first device, wherein the first and the second time information indicate the corresponding times of most recently registered revocation entities; and
copying, into the second revocation list of the second apparatus, each revocation entity registered in the first device after the corresponding time of the first most recently registered revocation entity in the second revocation list of the second device, if the first registration time of the extracted first time information of the first revocation list of the first device is later than the second registration time of the extracted second time information of the second revocation list of the second device.

10. The method of claim 9, wherein the copying of the revocation entity comprises copying, into the first revocation list of the first device, a revocation entity that is registered in the second device after the first registration time of first time information of the first revocation list of the first device, if the second registration time of the second extracted time information of the second revocation list of the second device is later than the first registration time of the extracted first time information of the first revocation list of the first device.

11. The method of claim 10, wherein the most recently registered revocation entities are a first set of most recently registered revocation entities and the method of claim 6 further comprising changing the first and the second registration times of the first and the second revocation lists into registration times of second set of most recently registered revocation entities among revocation entities of each of the first and the second revocation lists of the first and the second devices, the second set of most recently registered revocation entities being later in time than the first set of most recently registered revocation entities.

12. The method of claim 10, wherein one of the first device and the second device are portable storage devices.

13. The method of claim 9, wherein the second device is offline, wherein the first device is a portable memory card and updates the second revocation list of the second device and wherein if a revoked entity is to be restored, a new revocation entity is added to the revocation list with the flag value indicating that the contents identified in the respective entity are restored.

14. The method of claim 9, wherein to restore revoked content stored in a first revocation entity of the revocation list, adding a second revocation entity to the revocation list with the same unique content identifier and different value for the flag.

15. An apparatus for updating a revocation list, the apparatus comprising:
a revocation list storage unit which stores a revocation list comprising time information and at least one revocation entity, each comprising a unique content identifier linked to a corresponding time indicating registration or update of the revocation entity and a flag which indicates whether the contents identified in the respective entity are prohibited or restored, wherein the time information indicates the corresponding time of a first most recently registered revocation entity; and
a control unit which copies each revocation entity which is registered to a server after the corresponding time of the first most recently registered revocation entity, from a server into the revocation list.

16. The apparatus of claim 15, wherein the control unit changes the time information of the revocation list according to a registration time of a second most recently registered revocation entity among at the least one copied revocation entity, the registration time of the second most recently registered revocation entity being later in time than the registration time of the first most recently registered revocation entity.

17. The apparatus of claim 16, wherein the control unit stores the revocation list comprising the copied revocation entity in a portable storage device.

18. An apparatus for updating a revocation list, the apparatus comprising:
a revocation list storage unit which stores a revocation list comprising time information and at least one revocation entity, each comprising a unique content identifier linked to a corresponding time indicating registration or update of the revocation entity and a flag which indicates whether the contents identified in the respective entity are prohibited or restored, wherein time information indicates the corresponding time of a most recently registered revocation entity;
a revocation list extraction unit which extracts the time information of the revocation list stored in the revocation list storage unit, and time information of a revocation list of another apparatus; and
a control unit which copies, into the revocation list of the other apparatus, each revocation entity registered after corresponding time of the time information of the revocation list of the other apparatus, if the registration time of the extracted time information of the revocation list stored in the revocation storage unit, is later than the registration time of the extracted time information of the revocation list of the other apparatus.

19. The apparatus of claim 18, wherein the control unit copies, into the revocation list stored in the revocation storage unit, the registration entity that is registered in the other apparatus after the registration time of time information of the revocation list stored in the revocation storage unit, if the registration time of the extracted time information of the revocation list of the other apparatus is later than the registration time of the extracted time information of the revocation list stored in the revocation storage unit.

20. The apparatus of claim 19, wherein the most recently registered revocation entity is a first most recently registered revocation entity and wherein the control unit changes the registration times of the revocation lists into registration times of second most recently registered revocation entities among the revocation entities of each of the revocation lists of the apparatus and the other apparatus, the registration times of the second most recently registered revocation entities being later in time than the registration time of the first most recently registered revocation entity.

21. The apparatus of claim 18, wherein the other apparatus is a portable storage device comprising a revocation list storage unit which stores the revocation list of the other apparatus, the revocation list of the other apparatus comprising at least one revocation entity comprising a content unique identifier and time information indicating a registration time of a most recently registered revocation entity of the revocation list of the other apparatus.

* * * * *